United States Patent [19]

Merklein et al.

[11] Patent Number: 4,903,734

[45] Date of Patent: Feb. 27, 1990

[54] PRESSURE FLUID RESERVOIR

[75] Inventors: Dieter Merklein, Ludwigsburg; Ernst-Dieter Schaefer, Gerlingen, both of Fed. Rep. of Germany

[73] Assignee: Robert Bosch GmbH, Stuttgart, Fed. Rep. of Germany

[21] Appl. No.: 293,287

[22] Filed: Jan. 4, 1989

[30] Foreign Application Priority Data

Feb. 3, 1988 [DE] Fed. Rep. of Germany ....... 3803095

[51] Int. Cl.[4] ........ F16L 55/02

[52] U.S. Cl. ........ 138/31; 277/3

[58] Field of Search ........ 138/31, 120, 155; 220/3, 240, 303, 304; 277/3

[56] References Cited

U.S. PATENT DOCUMENTS

| | | | |
|---|---|---|---|
| Re. 24,532 | 9/1958 | Halladay et al. | 138/31 |
| 2,729,244 | 1/1956 | Alaska et al. | 138/31 |
| 2,734,531 | 2/1956 | Bizak | 138/31 |
| 2,742,929 | 4/1956 | Treseder | 138/31 |
| 2,746,485 | 5/1956 | Ashton | 138/31 |
| 4,651,782 | 3/1987 | Fulmer | 138/31 |

FOREIGN PATENT DOCUMENTS

| | | | |
|---|---|---|---|
| 2820124 | 11/1979 | Fed. Rep. of Germany . | |
| 1100778 | 9/1955 | France | 138/31 |
| 711704 | 7/1954 | United Kingdom | 138/31 |

*Primary Examiner*—James E. Bryant, III

*Attorney, Agent, or Firm*—Edwin E. Greigg

[57] ABSTRACT

A pressure fluid reservoir is made from two housing components, that are brought together with an outer and inner thread arrangement with end stops formed by adjacent ends of the two housing components. The first housing component of the pressure fluid reservoir includes two segments and the second housing component includes two guide faces with an inner thread and an outer thread located between them. The guide faces are disposed with such a length and such a spacing with respect to one another that prior to the threads being screwed together during assembly, the threads are sealed off from the reservoir chambers and two stop faces facing one another on the housing components come into contact on their ends once the screwing operation is completed. The ends are exposed to the outside so that the contact between the ends can be seen from the outside.

7 Claims, 2 Drawing Sheets

PRESSURE FLUID RESERVOIR

BACKGROUND OF THE INVENTION

The invention is based on a pressure fluid reservoir as defined herein. A pressure fluid reservoir of this kind is known from German Offenlegungsschrift No. 28 20 124.

In this known pressure fluid reservoir, two components each provided with a thread arrangement are brought into contact with a predetermined tightening torque via stop faces provided on separate housing components. In the assembled state, the two housing components are divided by a piston into a compression chamber and a pressure fluid storage chamber. During the assembly of the two components, if a defective thread or metal chips are caught in the thread arrangements, these cause a predetermined tightening torque to be reached before the stop faces meet, then a sealing element, disposed in and sealing off the pressure fluid storage chamber, may be pressed into an unclosed gap between the stop faces of the two housing components and destroyed. Moreover, when the two housing components are screwed together, metal chips from the thread arrangements can get into the chamber that stores the pressure fluid.

OBJECT AND SUMMARY OF THE INVENTION

The pressure fluid reservoir according to the invention has an advantage over the prior art that when two housing components that form a housing are assembled, their thread arrangements do not come into contact until after the two chambers of the pressure fluid reservoir have been sealed off from the thread arrangements.

It is particularly advantageous to provide the two housing components with stop faces, facing one another, that are visible from the outside, so that the required contact between the stop faces after assembly can be monitored from the outside.

In a further feature of the invention, it is especially advantageous to use a filling apparatus to fill the finally assembled pressure fluid reservoir.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
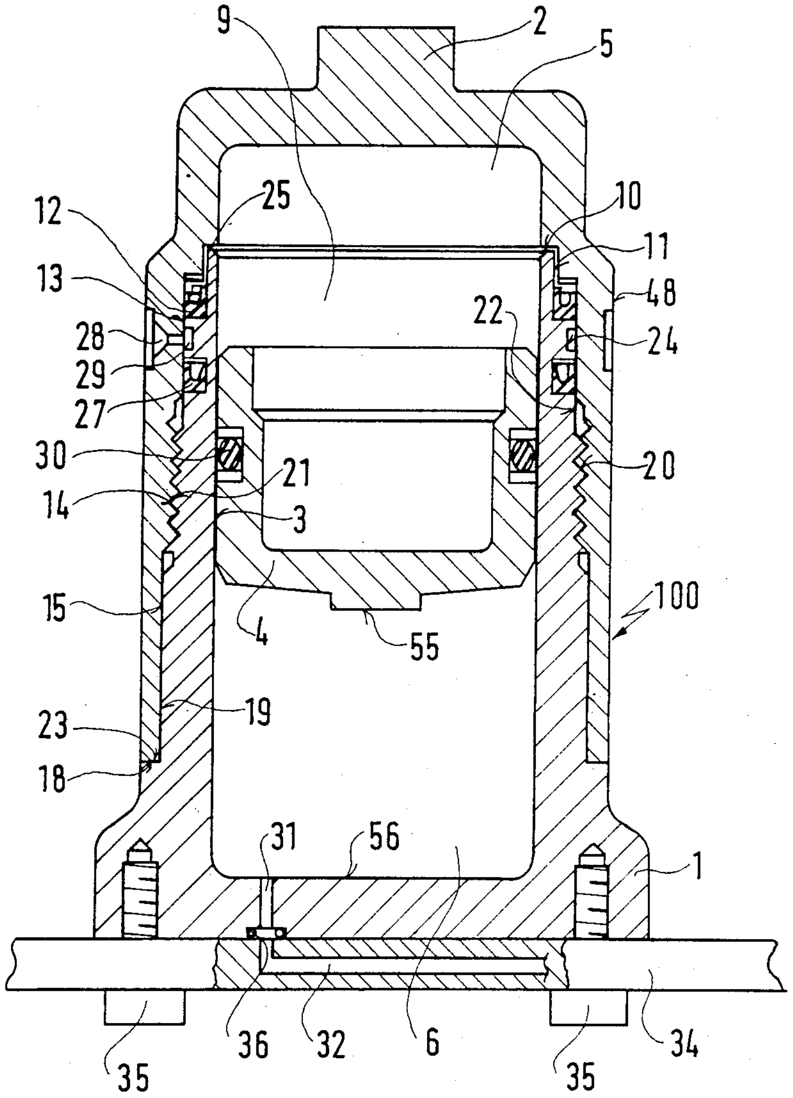
FIG. 1 shows one exemplary embodiment of a pressure fluid reservoir in accordance with the invention.

A pressure fluid reservoir 100 has two housing components 1, 2, that are screwed together and sealed off to form a housing. The first housing component 1 is provided with an opened end 9, which receives a piston 4 axially movably disposed in the housing. The piston 4 separates a first chamber 5, filled with a compression fluid, from a second chamber 6, filled with a pressure fluid, and is also provided with an end 10 oriented toward the component 2. The inner wall of the opening 9 serves as a guide track 3 of the piston 4. Beginning at the end 10, the housing 1 has a first segment 11 on the outer circumference of the component 1, having at least one sealing element 12, and contiguous with the sealing element 12 are a second segment 13 of larger diameter and a third segment 14 of still larger diameter. The third segment has an outer thread 20, with which a fourth segment 15 of still larger diameter is contiguous. The segment 13 includes an annular groove 24 that forms a chamber 29 and an annular groove that receives a sealing element 27.

Beginning at an end 18 of the second housing component toward the first housing component 1, the second housing component 2 includes a first guide face 19 that protrudes along the fourth segment 15 of the first housing component 1. The first guide face 19 is adjoined by a smaller diameter portion having an inside thread 21, which engages the outer thread 20 on the third segment 14 of the first housing component 1 and extends as far as a second guide face 22 of a smaller diameter than the threads. The second guide face 22 touches the second segment 13 of the first housing component 1. The first guide face 19 and the second guide face 22 are disposed with an axial length and a spacing from one another at the inside circumference of the second housing component 2 such that when the two housing components 1, 2 are assembled, the first guide face 19 of the second component 2 protrudes at least partway onto the fourth segment 15 of the first component 1, and the second guide face 22 of the second component 2 protrudes at least partway beyond both the second segment 13 and at least one sealing element 12 of the first component before the inside thread 21 and the outside thread 20 touch one another. The sealing element 27 disposed on the second segment 13 of the first component 1 following the groove 24 is contacted and covered by the second guide face 22 of the second housing component 2 during the process of screwing the two housing components 1, 2 together.

A fill opening 28 that leads into the chamber 29 formed by the groove 24 and part of the second guide face 22 is disposed on the outer circumference of the second component 2 of the pressure fluid reservoir 100; the fluid flow through the chamber 29 is in the direction toward the first chamber 5, because of the disposition of the overflowable sealing element 12, and from below the chamber 29, chamber 29 is sealed off by the sealing element 27. From the sealing element 12, a passage 25 formed in the first segment 11 of the first component 1 leads in this first segment 11 to the end 10 of the first component and thus to the first chamber 5.

In the vicinity of the guide track 3 of the first component 1, the piston 4 has a seal assembly 30, which is intended to substantially prevent a compression fluid from passing from the first chamber 5 into the second chamber 6.

A pressure fluid to be stored is fed into the second chamber 6 through a connection opening 31 from lines 32 and 34 which leads from a supply apparatus, not shown. The lines 32 and 34 are connected to the pressure fluid reservoir 100 with screws 35 and a sealing element 36.

Figure 2:
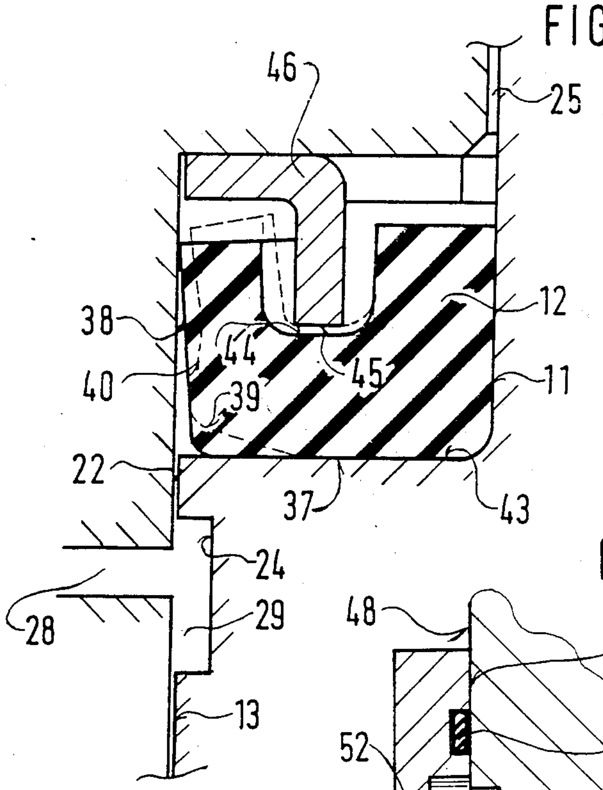
FIGS. 2 and 3, in fragmentary fashion, each show a further exemplary embodiment of a pressure fluid reservoir according to the invention.

FIG. 2, on a different scale, shows a detail of the pressure fluid reservoir 100 of FIG. 1, which is intended as an example to show clearly how the compression fluid overflows via the sealing element 12. Via the fill opening 28, the compression fluid can reach the chamber 29, the bottom 37 and outer lip 38 of the sealing element 12. The compression fluid pressure prevailing there moves a portion of the bottom 37 and the outer lip 38 into a new position 39, 40 shown in dashed lines, so that the compression fluid can reach the first chamber 5 through the passage 25. With a radially extending surface portion 44, the sealing element 12 then presses in the direction of a support element 46 against a side 45 of the support element 46 oriented toward the surface portion 44.

After the end of a filling operation, the outer lip 38 and the bottom 37 of the sealing element 12 return to their initial position, located between the circumferences of the second guide face 22 and first segment 11, and the pressure from the first chamber 5 presses the bottom 37 against a support face 43, oriented toward it, of the first component 1.

Figure 3:
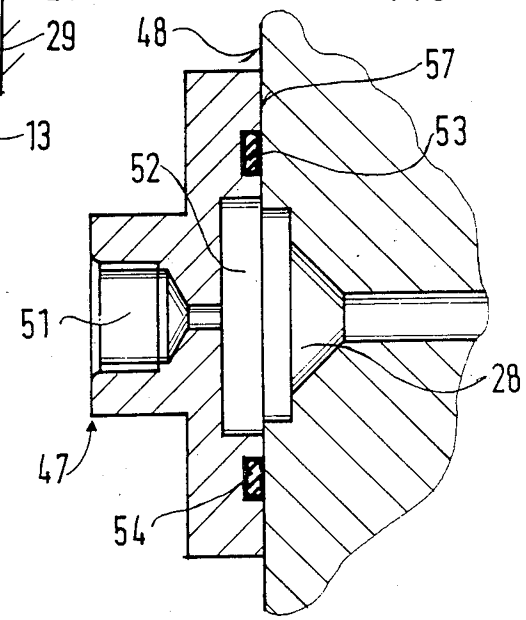

FIG. 3, is a modification in which a fill apparatus 47 is moved via the outer circumference 48 of the second component 2 into a predetermined position with respect to the fill opening 28 of the pressure fluid reservoir 100. The fill apparatus 47 is equipped with a connection 51, which discharges into an intermediate chamber 52, and two seal elements 53, 54, sealing it off from the pressure fluid reservoir 100, on the inner circumferential face 57 contacting the outer circumference 48 of the pressure fluid reservoir 100.

The mode of operation of the pressure fluid reservoir is known. It may be used in a hydraulic vehicle brake system. The pressure value of the compression fluid in the first chamber 5 of the pressure fluid reservoir 100 may be maintained within close-tolerance limits, by using the fill apparatus 47 at predetermined time intervals.

When the components are assembled, the piston 4 can be moved into the opening 9 of the first component 1 and allowed to stay there. The sealing element 27 is attached to the second segment 13 of the first component 1, while the sealing element 12 and support element 46 are attached to the first segment 11 of the first component 1. The first component 1 and the second component 2 are embodied such that upon assembly, the first guide face 19 of the second component 2 can be slipped with radial spacing over the sealing elements 12, 27 disposed on the first and second segments 11, 13 of the first component 1 and over the support element 46, and then, again with radial spacing, over the inner thread 21 onto the fourth segment 15 of the first component 1; in this process, until the inner thread 21 and outer thread 20 touch one another, partial guidance is established between the first guide face 19 of the second component 2 and the fourth segment 15 of the first component 1 and between the second guide face 22 of the second component 2 and the second segment 13, and at least one sealing element associated with the first component 1 is covered by the second guide face 22. For the ensuing assembly with the screw threads, all the sealing elements have now assumed a defined position in which they are reliably protected against slipping out of their sealing position. A secure assembly by the screw threads is assured by the provision that the components 1, 2 must come into contact with the two facing ends 18, 23, since a predetermined tightening torque is required if that is to happen. After the assembly, the first chamber 5 of the pressure fluid reservoir 100 can be filled with the compression fluid as described above. With little effort, via the outer circumference 48 of the pressure fluid reservoir 100, the fill apparatus 47 can be brought into a position that puts the connection 51 in communication with the fill opening 28 and, once an overflow of the sealing element 12 by the compression fluid is attained, in communication with the first chamber 5. The sealing elements 53, 54 of the fill apparatus 47 that seal off the outer circumference 48 of the pressure fluid reservoir 100 prevent leakage between the pressure fluid reservoir 100 and the fill apparatus 47. During the filling of the first chamber 5, the piston 4 will move to be seated upon a stop 55 on a bottom 56 of the first component 1.

Through the fill opening 28, a hydraulic fluid can be added to the compression fluid in the vicinity of the first chamber 5, for the sake of better sealing of the first chamber 5 in the vicinity of the sealing element 12.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A pressure fluid reservoir for making available a predetermined energy content in a pressure fluid chamber for a system requiring a predetermined energy, comprising first and second housing components forming a housing, said first and second housing components are threaded together and sealed off by at least one seal, said first housing component has an opening serving as a guide track for a piston, a piston disposed axially movably in said first housing component, said piston separates a first chamber to be filled with a compression fluid from a second chamber to be filled with a pressure fluid, a connection opening connected with said first housing component, said first housing component (1) includes an open end (10) oriented toward said second housing component (2), said open end has an outer circumference that forms a first segment (11) having a first diameter, at least one sealing element (12) surrounding said first segment, a second segment contiguous with said first segment, said second segment (13) has a second diameter which is larger than said first diameter, a third segment (14) contiguous with said second segment and having a third diameter which is larger than said second diameter, an outer thread (20) on said third diameter of said third segment, a fourth segment (15) having a fourth diameter which is larger than said third diameter, said fourth segment adjoins said third segment, said second housing component (2) includes an open end portion that is adapted to protrude beyond said open end of said first component (1) and includes an inner circumference having a first guide face (19) which in an assembled position contacts said fourth segment (15) of the first housing component, said second housing component includes a threaded portion contiguous with the first guide face (19) of said second housing component, said threaded portion has an inner thread (21) of smaller diameter than said first guide face which engages the outer thread (20) of said third segment of said first housing component, the inner thread (21) of said threaded portion being adjoined by a second guide face (22) which contacts the second segment (13) and the sealing element (12) of the first housing component (10), and that said first guide face (19) and said second guide face (22) of said second housing component (2) are disposed with an axial length and spaced apart from one another at the inner circumference such that when said first and second housing components (1, 2) are assembled, before the inner thread (21) and the outer thread

(20) of the components (1, 2) touch one another, the first guide face (19) of the second component (2) protrudes at least partway beyond the fourth segment (15) of said first housing component, and the second guide face (22) protrudes at least partway beyond both the second segment (13) and at least one sealing element (12) of said first housing component.

2. A pressure fluid reservoir as defined by claim 1, in which said first housing component (1) and said second housing component (2) have stop faces (18, 23) facing one another, which after assembly rest on one another and the contact of one with the another is monitorable from outside of said housing.

3. A pressure fluid reservoir as defined by claim 1, in which at least one sealing element (12) disposed between the circumferences of the second guide face (22) of the second housing component (2) and of the first segment (11) of the first housing component (1) permits fluid flow in a direction of the first chamber (5), for filling of the first chamber (5), and seals this chamber off after the filling to prevent flow from said chamber (5).

4. A pressure fluid reservoir as defined by claim 3, in which said sealing element (12) disposed between the circumferences of the second guide face (22) of the second housing component (2) and of the first segment (11) of the first housing component (1) has a radially extending support face (44) as well as an axially extending outer lip (38) resting on the second guide face (22) of the second component (2), a support element (46) juxtaposed said support face of said sealing element (12), said outer lip (38), upon filling of the first chamber (5) by the compression fluid, is displaceable in such a manner that said outer lip comes to rest on said support element (46) by means of which a radial motion of the sealing lip is likewise limited.

5. A pressure fluid reservoir as defined by claim 4, which includes an annular groove (24) disposed in said second segment of said first housing component, a fill opening (28) connected to the outer circumference of the second housing component (2) which extends into a chamber formed by said annular groove between the circumferences of the second segment (13) of the first housing component (1) and the second guide face (22) of the second housing component (2), through which an inflow of a compression fluid into the first chamber (5) takes place in the direction of the sealing element (12) through said groove (24), and that a second sealing element (27) disposed in the direction of the screw connection (20, 21) reinforces the inflow of the compression fluid in a specified direction.

6. A pressure fluid reservoir as defined by claim 5, in which a fill apparatus (47) can be slipped over the outer circumference (48) of the second housing component (2) and disposed such that via a connection (51), a compression fluid can flow into an intermediate chamber (52), which is sealed off on the outer circumference (48) of the second housing component (2) by two sealing elements (53, 54), and from there on flow through the fill opening (28) and via the sealing element (12) into the first chamber (5) of the pressure fluid reservoir (100).

7. A pressure fluid reservoir as defined by claim 1, in which a hydraulic fluid can be added to a chamber (6) below piston (4) which applies a pressure against the compression fluid of the first chamber (5).

* * * * *